United States Patent
Devendrachar et al.

(10) Patent No.: US 12,068,959 B1
(45) Date of Patent: Aug. 20, 2024

(54) WEIGHTED ECPM OVER SHARED TRANSPORT INTERFACES AND PER FLOW HASH LOAD BALANCING PER TENANT IN A MULTI-TENANT ENVIRONMENT

(71) Applicant: Cisco Technology, Inc., San Jose, CA (US)

(72) Inventors: Ganesh Devendrachar, Milpitas, CA (US); Ajeet Pal Singh Gill, Fremont, CA (US); Balaji Sundararajan, Fremont, CA (US); Srilatha Tangirala, San Jose, CA (US); Satish Varadarajula, Livermore, CA (US); Satyajit Das, Lake Tapps, WA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/225,487

(22) Filed: Jul. 24, 2023

(51) Int. Cl.
    *H04L 45/76* (2022.01)
    *H04L 45/24* (2022.01)
    *H04L 47/125* (2022.01)

(52) U.S. Cl.
    CPC ............ *H04L 45/76* (2022.05); *H04L 45/24* (2013.01); *H04L 47/125* (2013.01)

(58) Field of Classification Search
    None
    See application file for complete search history.

(56) References Cited

U.S. PATENT DOCUMENTS

| | | | | |
|---|---|---|---|---|
| 11,677,720 | B2 * | 6/2023 | Mayya | H04L 63/0281 726/15 |
| 11,943,146 | B2 * | 3/2024 | Simlai | H04L 47/2491 |
| 2013/0286846 | A1 | 10/2013 | Atlas et al. | |
| 2013/0339544 | A1 | 12/2013 | Mithyantha | |
| 2019/0386918 | A1 * | 12/2019 | Iyer | H04L 43/0829 |
| 2022/0116311 | A1 | 4/2022 | Mestery et al. | |
| 2022/0116445 | A1 * | 4/2022 | Filippou | H04L 41/0853 |
| 2022/0385575 | A1 * | 12/2022 | Langemak | H04L 41/0853 |
| 2023/0106234 | A1 | 4/2023 | Shreyas et al. | |
| 2023/0188502 | A1 * | 6/2023 | Thoria | H04L 12/4633 726/15 |

OTHER PUBLICATIONS

Hamdan, M., Hassan, E., Abdelaziz, A., Elhigazi, A., Mohammed, B., Khan, S., . . . & Marsono, M. N. (2021). A comprehensive survey of load balancing techniques in software-defined network. Journal of Network and Computer Applications, 174, 102856.

* cited by examiner

*Primary Examiner* — Quang N Nguyen
(74) *Attorney, Agent, or Firm* — Lee & Hayes, P.C.

(57) ABSTRACT

Techniques for automatically providing per tenant weighted DCMP over shared transport interfaces and automated flow has load balancing are described. The techniques may include onboarding the tenant to the local multi-tenant edge device associated with a tenant, where the resource profile defines a traffic allowance per transport interface for the tenant. Local weight per transport interface is applied. Information including local weight per transport interface is transmitted to a remote device via an SD-WAN controller. Information including a remote weight per transport interface of the remote device is received via the SD-WAN controller. Traffic is routed from the tenant based on local weight per transport interface of the local device and remote weight per transport interface of the remote device.

20 Claims, 12 Drawing Sheets

700 ↘

```
┌─────────────────────────────────────────────────────────────────────┐
│ DETERMINE A RESOURCE PROFILE ASSOCIATED WITH A TENANT, WHEREIN THE  │
│ RESOURCE PROFILE DEFINES A CUSTOMIZABLE TRAFFIC ALLOWANCE PER TRANSPORT │
│ INTERFACE FOR THE TENANT ON THE LOCAL MULTI-TENANT EDGE DEVICE      │
│                              702                                    │
└─────────────────────────────────────────────────────────────────────┘
                                 ↓
┌─────────────────────────────────────────────────────────────────────┐
│ ONBOARD THE TENANT TO THE LOCAL MULTI-TENANT EDGE DEVICE ACCORDING TO THE │
│                         RESOURCE PROFILE                            │
│                              704                                    │
└─────────────────────────────────────────────────────────────────────┘
                                 ↓
┌─────────────────────────────────────────────────────────────────────┐
│ APPLY THE LOCAL WEIGHT PER TRANSPORT INTERFACE TO RESPECTIVE TRANSPORT │
│        INTERFACES OF THE LOCAL MULTI-TENANT EDGE DEVICE             │
│                              706                                    │
└─────────────────────────────────────────────────────────────────────┘
                                 ↓
┌─────────────────────────────────────────────────────────────────────┐
│ TRANSMIT, TO A REMOTE MULTI-TENANT EDGE DEVICE AND VIA AN SD-WAN    │
│ CONTROLLER, INFORMATION INCLUDING THE LOCAL WEIGHT PER TRANSPORT INTERFACE │
│        OF THE LOCAL MULTI-TENANT EDGE DEVICE FOR THE TENANT         │
│                              708                                    │
└─────────────────────────────────────────────────────────────────────┘
                                 ↓
┌─────────────────────────────────────────────────────────────────────┐
│ RECEIVE, FROM THE REMOTE MULTI-TENANT EDGE DEVICE AND VIA THE SD-WAN │
│ CONTROLLER, INFORMATION INCLUDING A REMOTE WEIGHT PER TRANSPORT INTERFACE │
│       OF THE REMOTE MULTI-TENANT EDGE DEVICE FOR THE TENANT         │
│                              710                                    │
└─────────────────────────────────────────────────────────────────────┘
                                 ↓
┌─────────────────────────────────────────────────────────────────────┐
│ ROUTE TRAFFIC FROM THE TENANT BASED AT LEAST IN PART ON THE LOCAL WEIGHT PER │
│ TRANSPORT INTERFACE OF THE LOCAL MULTI-TENANT EDGE DEVICE AND THE REMOTE │
│ WEIGHT PER TRANSPORT INTERFACE OF THE REMOTE MULTI-TENANT EDGE DEVICE │
│                              712                                    │
└─────────────────────────────────────────────────────────────────────┘
```

```
┌─────────────────────────────────────────────────────────────────────┐
│ ASSIGN A FIRST FLOW HASHING ALGORITHM TO THE TENANT WHEN THE TENANT IS │
│           ONBOARDED TO THE LOCAL MULTI-TENANT EDGE DEVICE            │
│                                 802                                  │
└─────────────────────────────────────────────────────────────────────┘
                                  │
                                  ▼
┌─────────────────────────────────────────────────────────────────────┐
│ BASED AT LEAST IN PART ON APPLYING THE FIRST FLOW HASHING ALGORITHM TO TENANT │
│  INGRESS TRAFFIC, DETERMINE A FIRST LOAD BALANCE OF EGRESS TRAFFIC FOR THE   │
│    TENANT ON INDIVIDUAL TRANSPORT INTERFACES OF THE LOCAL MULTI-TENANT EDGE  │
│                                  DEVICE                                      │
│                                   804                                        │
└─────────────────────────────────────────────────────────────────────┘
                                  │
                                  ▼
┌─────────────────────────────────────────────────────────────────────┐
│ CALCULATE, BY A CONTEXT AWARE FLOW LOAD BALANCING UNIT OF THE LOCAL MULTI- │
│ TENANT EDGE DEVICE, A SECOND LOAD BALANCE OF EGRESS TRAFFIC FOR A SECOND  │
│   FLOW HASHING ALGORITHM AVAILABLE TO THE LOCAL MULTI-TENANT EDGE DEVICE  │
│                                 806                                       │
└─────────────────────────────────────────────────────────────────────┘
                                  │
                                  ▼
┌─────────────────────────────────────────────────────────────────────┐
│  DETERMINE, BASED AT LEAST IN PART ON THE FIRST LOAD BALANCE AND THE SECOND │
│  LOAD BALANCE, WHETHER THE FIRST FLOW HASHING ALGORITHM OR THE SECOND FLOW  │
│                       HASHING ALGORITHM IS OPTIMAL                          │
│                                  808                                        │
└─────────────────────────────────────────────────────────────────────┘
                                  │
                                  ▼
┌─────────────────────────────────────────────────────────────────────┐
│  BASED ON THE FIRST FLOW HASHING ALGORITHM BEING OPTIMAL, CONTINUE TO APPLY │
│  THE FIRST FLOW HASHING ALGORITHM TO THE TENANT INGRESS TRAFFIC ON THE LOCAL│
│                        MULTI-TENANT EDGE DEVICE                             │
│                                  810                                        │
└─────────────────────────────────────────────────────────────────────┘
                                  │
                                  ▼
┌─────────────────────────────────────────────────────────────────────┐
│ BASED ON THE SECOND FLOW HASHING ALGORITHM BEING OPTIMAL, APPLY THE SECOND │
│  FLOW HASHING ALGORITHM TO THE TENANT INGRESS TRAFFIC ON THE LOCAL MULTI- │
│                          TENANT EDGE DEVICE                                │
│                                 812                                        │
└─────────────────────────────────────────────────────────────────────┘
```

FIG. 8

WEIGHTED ECPM OVER SHARED TRANSPORT INTERFACES AND PER FLOW HASH LOAD BALANCING PER TENANT IN A MULTI-TENANT ENVIRONMENT

TECHNICAL FIELD

The present disclosure relates generally to automatically providing per tenant weighted ECMP over shared transport interfaces and automated flow hash load balancing in a multi-tenant SD-WAN.

BACKGROUND

Today's networking evolution is moving to Software Defined Wide Area Networks (SD-WAN), a virtual WAN architecture that allows enterprise organizations to leverage any combination of transport services (including MPLS, LTE, broadband internet service, etc.) to securely connect users, applications, and data across multiple locations while providing improved performance, reliability, and scalability, while at the same time providing centralized control and visibility over the entire network. SD-WAN functions by creating a network of SD-WAN devices connected by encrypted tunnel. An SD-WAN service provider that provides connection services for enterprise organizations, or tenants, provides each tenant with its own dedicated SD-WAN edge device (e.g., edge router) to connect to the SD-WAN overlay. The dedicated edge device for the tenant is onboarded to the network, and its connections configured for the tenant. This architecture is the same whether a tenant is a large enterprise organization requiring extensive connection bandwidth, or a small "mom and pop" shop that requires relatively little bandwidth.

Often there are multiple paths available for tenant traffic that meet a Service Level Agreement (SLA) (e.g., loss, latency, jitter, etc.) for the tenant, and traffic is usually load-balanced across multiple paths using an Equal Cost Multi-Path (ECMP) method or a weighted ECMP method. Weighted ECMP enables load balancing of traffic between equal cost paths in proportion to the capacity of the local links.

Additionally, in a typical SD-WAN edge device the incoming packets are hashed based on a tuple (e.g., source and destination IP, source and destination port, and protocol, etc.) and the hash result is reduced to a number of bits corresponding to the number of outgoing transport tunnels. A predetermined "hash to tunnel mapping table" assigns the hash values to outgoing transport tunnels. Typically, an SD-WAN edge device supports different types of flow hashing algorithms and a tenant may pick one of them at a global configuration level and the chosen algorithm is expected to give a decent load balance among the available transport tunnels. Once the flow hashing algorithm is selected, it will not change unless the tenant explicitly changes to a different flow hashing algorithm. Unfortunately, even when a particular flow hashing algorithm is giving an acceptable load balance, ingress traffic patterns of a tenant may change over a period of time resulting in a new flow distribution that is no longer in an acceptable range. When this happens, the tenant must explicitly choose and implement a different flow hashing algorithm. Unfortunately, there is no guarantee that the new flow hashing algorithm will result is an improved load balance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 is a flow diagram illustrating an example method associated with the techniques described herein for automatically providing per tenant weighted ECMP over shared transport interfaces in a multi-tenant SD-WAN.

FIG. 8 is a flow diagram illustrating an example method associated with the techniques described herein for automated flow hash load balancing in a multi-tenant SD-WAN.

DESCRIPTION OF EXAMPLE EMBODIMENTS

Overview

Figure 1:
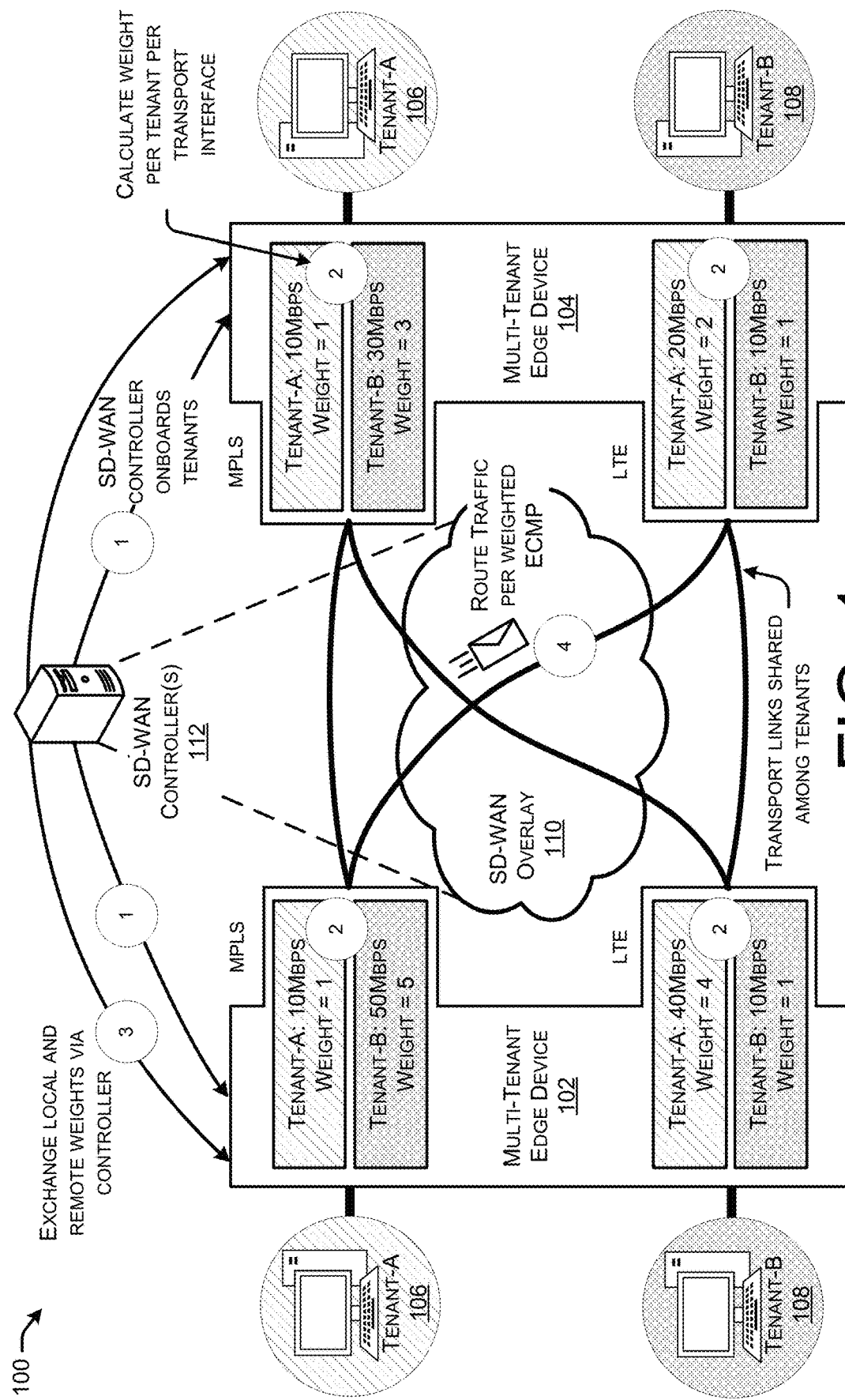
FIG. 1 illustrates an example environment that may implement various aspects of the technologies directed to automatically providing per tenant weighted ECMP over shared transport interfaces in a multi-tenant SD-WAN network.

This disclosure describes a method, performed at least in part by a local edge device, for providing per tenant weighted equal-cost multi-path (ECMP) routing over shared transport interfaces in a multiple tenant SD-WAN. The method includes determining a resource profile associated with a tenant, wherein the resource profile defines a customizable traffic allowance per transport interface for the tenant on the local edge device. In addition, the method includes onboarding the tenant to the local edge device according to the resource profile. The method also includes, calculating, based at least in part of the resource profile, a local weight per transport interface for individual transport interfaces for which the tenant is allowed to transmit traffic from the local edge device. Additionally, applying the local weight per transport interface to respective transport interfaces of the local edge device. The method also includes transmitting, to a remote edge device and via an SD-WAN controller, information including the local weight per transport interface of the local edge device for the tenant. The method may also include, receiving, from the remote edge device and via the SD-WAN controller, information including a remote weight per transport interface of the remote edge device for the tenant. Finally, the method includes routing traffic from the tenant based at least in part on the local weight per transport interface of the local edge device and the remote weight per transport interface of the remote edge device.

Additionally, the techniques described herein may be performed by a system and/or device having non-transitory computer-readable media storing computer-executable instructions that, when executed by one or more processors, performs the method described above.

Example Embodiments

As described above, a Software Defined Wide Area Network (SD-WAN) allows enterprise organizations to leverage any combination of transport services (including MPLS, LTE, broadband internet service, etc.) to securely connect users, applications, and data across multiple locations while providing improved performance, reliability, and scalability, while at the same time providing centralized control and visibility over the entire network. However, traditionally, an SD-WAN service provider must dedicate an SD-WAN edge device for every tenant that connects to the SD-WAN overlay, regardless of the connection bandwidth that the tenant may require. Thus, for small businesses or "mom and pop shops" a dedicated edge device results in wasted resources. Additionally, once the dedicated edge device is onboarded to the SD-WAN network and configured for the tenant, incoming tenant traffic is hashed using a pre-determined flow hashing algorithm that the tenant selects, and the hash result is reduced to a number of bits corresponding to the number of outgoing transport tunnels. A predetermined "hash to tunnel mapping table" assigns the hash values to outgoing transport tunnels. If the load balance is not within an acceptable range, or changes to an unacceptable range due to changes in ingress traffic patterns over time, the flow hashing algorithm is cumbersome to change, requiring the tenant to explicitly implement a different flow hashing algorithm, with no guarantee that the load balance will improve.

This disclosure describes techniques for onboarding multiple tenants to a single edge device in an SD-WAN, automatically providing per tenant weighted ECMP over shared transport interfaces on the edge device, and automatically implementing an optimal flow hashing algorithm per tenant on single tenant edge device, multi-tenant edge devices and across the SD-WAN.

With multi-tenant SD-WAN edge devices, multiple tenants share transport/WAN connections and each tenant's traffic is sent over the shared connection. When a tenant is on boarded to a local edge device, (i.e., connected to the SD-WAN overlay via the edge device), the tenant is allowed a portion of bandwidth on each interface based on a tenant resource profile. The tenant resource profile may be determined based on a re-usable tenant tiering profile as part of an agreement with an SD-WAN service provider, and may include the transport interfaces the tenant is allowed to use (e.g., tenant may send traffic via MPLS and LTE), and the bandwidth the tenant is allowed on the individual transport interfaces the tenant is allowed to use (e.g., tenant may use 20 Mbps from MPLS and 40 Mbps from LTE). Additionally, if the tenant comprises more than one location, the tenant is onboarded to an SD-WAN edge device at each location, the tenant resource profile may indicate different allowed interfaces and bandwidth per location (e.g., tenant may use 20 Mbps from MPLS and 40 Mbps from LTE in San Jose and 10 Mbps from MPLS and 20 MBPS from LTE in New York).

The local edge device on which the tenant is onboarded, may automatically calculate local weights of each transport link of the tenant. For example, for a tenant that is allowed 20 Mbps from MPLS and 40 Mbps from LTE on the local edge device, the weights would be calculated as 1 for MPLS and 2 for LTE because the ratio of MPLS to LTE (20 Mbps/40 Mbps) is 1 to 2. On a multi-tenant edge device, since multiple tenants use the same transport interfaces, the SD-WAN service provider may apply different local weights to different tenants on the shared interfaces based on tenant requirements. Additionally, the local weights per tenant may be auto adjusted to maximize the available bandwidth per tenant across multiple transport interfaces of the local edge device. The local edge device may also transmit the calculated weights to an SD-WAN controller (e.g., as part of a Transport Locator (TLOC) advertisement), and the SD-WAN controller will relay the per tenant local weights for the local edge device to remote edge devices (e.g., remote routers on which the tenant is onboarded at remote locations). Additionally, the local edge device will receive remote weights per transport interface for remote edge devices of the tenant from the SD-WAN controller. The local edge device will maintain the remote next hop per tenant and use remote tenant transport weights and local weights to construct the tenant's next hop chain which will represent per tenants local in and remote weights. Thus, ECMP per tenant may be achieved on the same set of transport interfaces across multiple tenants.

Additionally, to determine which transport interface a particular flow will use on an SD-WAN edge device, the incoming packets are hashed based on a tuple. For example, a five-tuple hash (source IP, destination IP, source port, destination port, protocol), a four-tuple hash (source IP, destination IP, source port, destination port), a two-tuple hash (source IP, destination IP), or any other appropriate and available flow hashing algorithm may be used. The hash results are reduced to a number of bits corresponding to the number of outgoing transport tunnels available. The final unique number is assigned a predetermined available transport tunnel. Each tenant onboard a multi-tenant SD-WAN edge device, may use the same or different flow hashing algorithm, and the resulting cumulative load balance of the multi-tenant edge device may or may not reflect a load balance that is within an acceptable range. Thus, described herein are techniques for leveraging context aware flow load balancing to automatically applying flow hashing algorithms per tenant in a multi-tenant environment to achieve an optimal load balance per device in the SD-WAN network. A separate unit, or module of an edge device constantly monitors the ingress traffic and makes a statistical model of all possible combinations and evaluates each supported flow hashing algorithm and the corresponding hash to tunnel mapping.

When tenants are onboarded to an edge device, they are given a default flow hashing algorithm, which the tenant may choose. When a packet is received, the flow hash is computed using the packet parameters per the tuple used in the flow hashing algorithm (e.g., a two-tuple using source IP and destination IP as the packet parameters). The result of the hash is used to choose the final egress transport link. At the same time, a context aware flow hashing logic unit of the edge device is running in parallel. The context aware flow hashing logic unit will periodically sample the input traffic of a tenant and use the packet parameters to calculate the hash results for other supported flow hashing algorithms and build a statistical model of them. Over a predetermined time period a hash algorithm monitor of the edge device will collect sufficient data to determine the best suitable flow hashing algorithm for each tenant. In addition, the hash algorithm monitor may determine the best hash to tunnel table arrangement for each algorithm. These stats may also be sent to an SD-WAN network controller along with the parameters. The SD-WAN network controller will run inter-context aware flow hashing at a network level, and over a predetermined period of time (e.g., six months) the SD-WAN controller will rank all supported flow hashing algorithms for each tenant on each edge device and determine an optimal flow hashing algorithm for each tenant and an optimal hash to tunnel table arrangement for the optimal flow hashing algorithm. The SD-WAN network controller may then apply the optimal flow hashing algorithm and optimal hash to tunnel table arrangement for the optimal flow hashing algorithm to each individual tenant (for example, during a maintenance window) or suggest the optimal combination to the tenant to take further action. Thus, each flow hashing algorithm available may be continuously monitored, and the optimal flow hashing algorithm applied based on the dynamics of the tenants and the input traffic patterns.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 that may implement various aspects of the technologies directed to automatically providing per tenant weighted ECMP over shared transport interfaces in a multi-tenant SD-WAN network. Environment 100 includes a first multi-tenant edge device 102 and a second multi-tenant edge device 104. Multi-tenant edge device 102 and multi-tenant edge device 104 represent edge devices in remote locations and connect tenant-A 106 and tenant-B 108 to the SD-WAN overlay 110 at their respective locations. Example environment 100 also include one or more SD-WAN controllers 112. Both multi-tenant edge device 102 and multi-tenant edge device 104 have two transport interfaces on which tenant-A 106 and tenant-B 108 are allowed to transmit traffic according to their respective resource profiles, MPLS and LTE. MPLS and LTE are merely examples of transport interfaces that may be available on a multi-tenant edge device and not a limitation. Finally, example environment 100 includes multiple transport links between the transport interfaces of multi-tenant edge device 102 and multi-tenant edge device 104 (MPLS to LTE, MPLS to MPLS, LTE to MPLS, and LTE to LTE). The transport links are shared among tenants that are onboarded to the multi-tenant edge devices, which in FIG. 1 are tenant-A 106 and tenant-B 108.

At (1) the SD-WAN controller 112 onboards tenant-A 106 and tenant-B 108 onto multi-tenant edge device 102 and multi-tenant edge device 104 according to a resource profile associated with each respective tenant. The resource profile defines a customizable traffic allowance per transport interface for each tenant on board the local edge device. For example, in FIG. 1 tenant-A 106 is allowed a bandwidth of 10 Mbps to transmit traffic from the MPLS transport interface of multi-tenant edge device 102 and a bandwidth of 40 Mbps to transmit traffic from the LTE transport interface of multi-tenant edge device 102. Similarly, tenant-B 108 is allowed a bandwidth of 50 Mbps to transmit traffic from the MPLS transport interface of multi-tenant edge device 102 and a bandwidth of 10 Mbps to transmit traffic from the LTE transport interface. The resource profile to use for a tenant may be defined and customized via an SD-WAN controller dashboard, the process for which is described in detail with regard to FIG. 2 below.

At (2) the multi-tenant edge devices calculate a weight per tenant on each transport interface. For example, on multi-tenant edge device 102 the weight calculated for tenant-A 106 is 1 for MPLS and 4 for LTE because the ratio of allowed Mbps for tenant-A 106 on MPLS to LTE is 10 Mbps/40 Mbps which is a 1/4 ratio. Similarly, and the calculated weight for tenant-B 108 on multi-tenant edge device 102 is 5 for MPLS and 1 for LTE because the ratio of allowed Mbps for MPLS to Mbps for LTE is 50 Mbps/10 Mbps which is a 5/1 ratio. Similarly, the weights calculated for the MPLS transport interface on multi-tenant edge device 104 for tenant-A 106 and tenant-B 108 are 1 and 3 respectively. The LTE transport interfaces for multi-tenant edge device 104 also show the calculated weights for tenant-A 106 and tenant-B 108 as 2 and 1 respectively.

At (3) multi-tenant edge device 102 transmits information including its local weights per transport interface to multi-tenant edge device 104 via the SD-WAN controller 112. Similarly, multi-tenant edge device 104 also transmits information including its local weights per transport interface to multi-tenant edge device 102 via the SD-WAN controller 112. For example, the information including local weights per transport interface may be transmitted from a local multi-tenant edge device to the SD-WAN controller as part of a TLOC advertisement, and the SD-WAN controller will relay the per tenant local weights for the local edge device to remote edge devices. Additionally, the local edge device will receive remote weights per transport interface for remote edge devices of the tenant from the SD-WAN controller 112.

At (4) traffic is routed between multi-tenant edge device 102 and multi-tenant edge device 104 according to the per tenant weight per interface of multi-tenant edge device 102 and multi-tenant edge device 104. For example, the local multi-tenant edge device will maintain the remote next hop per tenant and use remote tenant transport weights and local weight to construct the tenant's next hop chain which will represent per tenants local and remote weights. Thus, weighted ECMP per tenant may be achieved on the same set of transport interfaces across multiple tenants. FIG. 1 illustrates tenant-A 106 and tenant-B 108 sharing each of the depicted transport links. However, this is merely an example and tenant-A 106 may be allowed to transmit traffic on more or less transport interfaces than tenant-B 108, and the same of different transport interfaces as tenant-B 108. Each tenant transmits according to their individual resource profile as described above at (1) and below with reference to FIG. 2.

Figure 2:
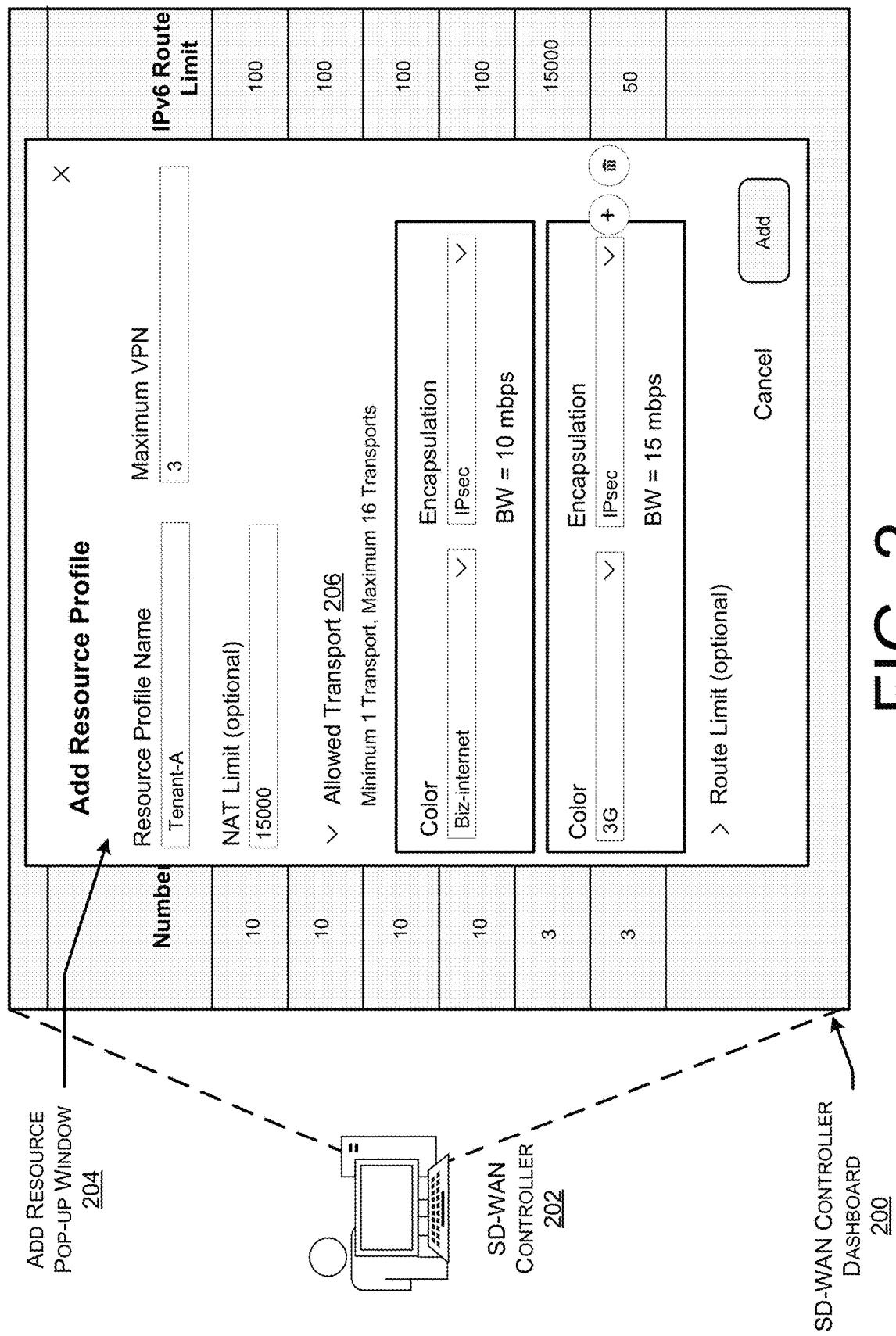
FIG. 2 illustrates an example of an SD-WAN controller dashboard used to define a resource profile for a tenant as described herein.

FIG. 2 illustrates an example SD-WAN controller dashboard 200 for defining a resource profile for a tenant. The SD-WAN controller dashboard 200 is merely an example, and any given SD-WAN controller dashboard may have more or fewer options, similar or different option, the same or different interactive elements (e.g., pull down menus, selection buttons, text boxes, etc.), and may be displayed in a similar or different layout.

The SD-WAN controller dashboard 200 of the SD-WAN controller 202 may be used by an SD-WAN network administrator to define resource profiles for tenants as illustrated in FIG. 2. Included in FIG. 2 is an example add resource pop-up window 204 for defining a resource profile for a tenant when onboarding the tenant to a multi-tenant edge device. Included on the add resource pop-up window 204 is an allowed transport 206 section. In the allowed transport 206 section an administrator may define between one and 16 transports allowed for a tenant. Each defined transport includes a color, encapsulation and bandwidth allowed for the transport. The example in FIG. 2 defines two allowed transports for tenant-A on the multi-tenant edge device. Tenant-A is allowed 10 Mbps of traffic on biz-internet using IPsec encapsulation and 15 Mbps of traffic on 3G using IPsec encapsulation on the multi-tenant edge device on which tenant-A is being onboarded. Thus, the multi-tenant edge device on which tenant-A is being onboarded, will calculate the local weights per interface as 2 for biz-internet and 3 for 3G because the ratio of 10 Mbps on biz-internet and 15 Mbps on 3G is a ratio of 2/3.

A tenant being onboarded is defined as a collection of VPNs. Thus, a VPN group is automatically defined for the tenant. When a new VPN is created on the multi-tenant edge device for the tenant, it is automatically added to the VPN group. The SD-WAN controller 202 configures the per VPN group Quality of Service (QOS) on the multi-tenant edge device, which results in a per tenant level bandwidth shaping per interface. Additionally, the SD-WAN controller 202 automatically configures or updates the VPN group when a tenant level VPN action (e.g., add/delete) is performed.

Figure 3B:
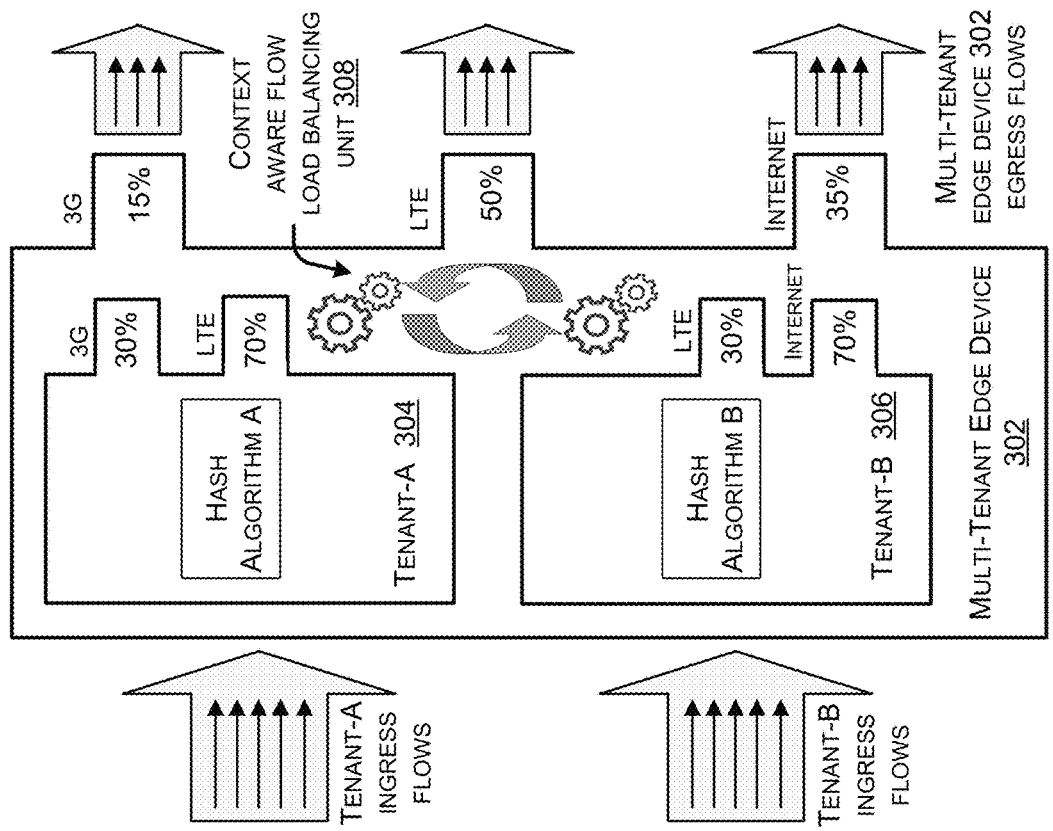
FIG. 3B illustrates an example of the multi-tenant edge device of FIG. 3A after automated context aware flow load balancing with an acceptable load balance.
Figure 3A:
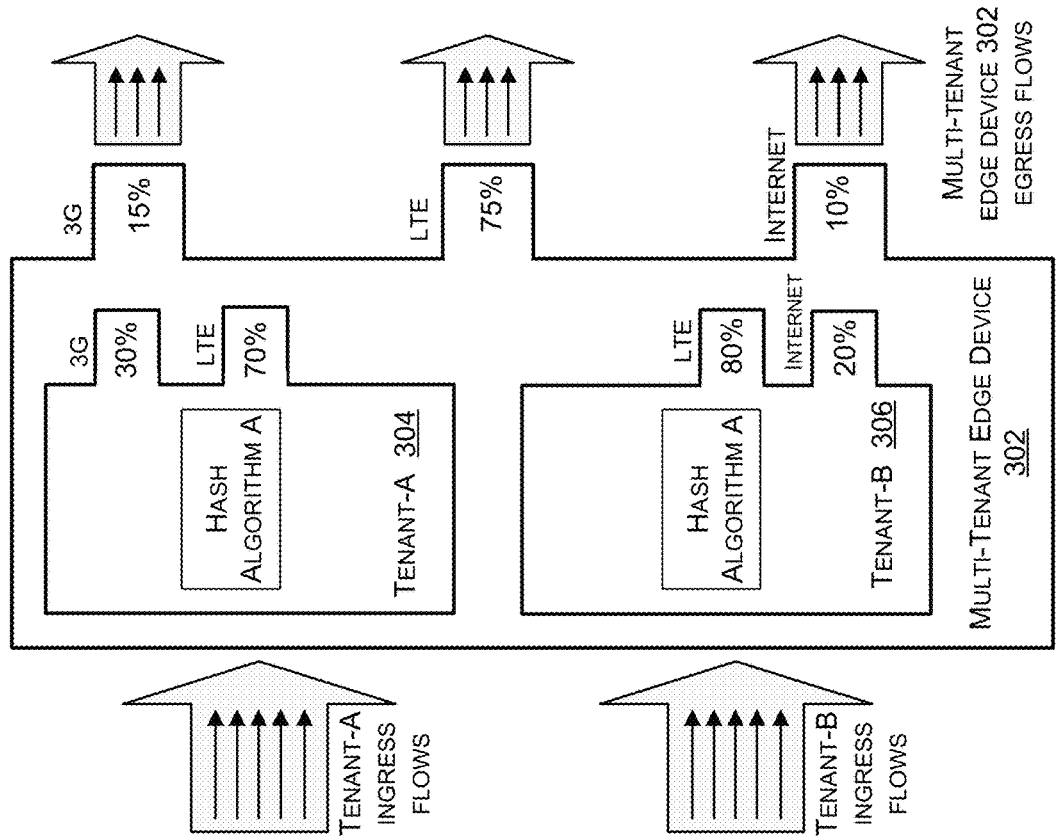
FIG. 3A illustrates an example of a multi-tenant edge device with and unacceptable load balance prior to automated context aware flow load balancing.

FIG. 3A illustrate an example in which a multi-tenant edge device is experiencing a load balance that is outside an accepted range prior to automated context aware flow load balancing, and FIG. 3B illustrates the same multi-tenant edge device after context aware flow load balancing resulting in an accepted load balance range.

In FIG. 3A multi-tenant edge device 302 has two tenants onboard, tenant-A 304 and tenant-B 306. Tenant-A 304 is using hash algorithm A on incoming packet parameters to determine an egress transport link, which will be either 3G or LTE per the resource profile associated with tenant-A 304 as described above with reference to FIG. 1 and FIG. 2. Tenant-A 304 is only allowed to transmit via 3G or LTE. Based on the results of hash algorithm A, the load balance of tenant-A 304 traffic is 30% 3G and 70% LTE. Tenant-B 306 is also using hash algorithm A (note: this is merely an example and tenant-B 306 may initially use a same or different hash algorithm than tenant-A 304, which may (or may not) result in load balance issues, and require similar load balancing solutions) on incoming packet parameters to determine an egress transport link, which will be either LTE or Internet according to the resource profile associated with tenant-B 306. Based on the results of hash algorithm A, the load balance of tenant-B 306 traffic is 80% LTE and 20% Internet. Thus, the cumulative load balance for multi-tenant edge device 302 is 15% 3G, 75% LTE, and 10% Internet. Even if separately tenant-A 304 and tenant-B 306 are achieving a flow load balance within an acceptable range, the cumulative load balance of multi-tenant edge device 302 may not be within an acceptable range. In the example illustrated in FIG. 3A, transport tunnel LTE is getting hot spotted as significantly more traffic is sent on it compared to the other transport tunnels, while transport tunnel 3G and Internet are under-utilized.

FIG. 3B illustrates a context aware flow load balancing unit 308 that may be used to automatically applying flow hashing algorithms per tenant in a multi-tenant environment to achieve an optimal load balance per device in the SD-WAN network. The context aware flow hashing unit 308 of multi-tenant edge device 302 will periodically sample the ingress traffic of each tenant, tenant-A 304 and tenant-B 306, and use the packet parameters to calculate the hash results for other supported flow hashing algorithms and build a statistical model of the algorithms. These hash stats are maintained per SLA. Over a predetermined time period the context aware flow hashing unit 308 of the multi-tenant edge device 302 may monitor the algorithm hash results and will collect sufficient data to determine the best suitable, or optimal, flow hashing algorithm for each tenant. In other words, an optimal flow hashing algorithm for each tenant will result in a cumulative load balance at the device level that approaches an equal balance of egress traffic for each transport interface. In the example illustrated in FIG. 3B, by changing the flow hashing algorithm from hash algorithm A to hash algorithm B for tenant-B 306, multi-tenant edge device 302 can achieve a much more balanced cumulative load balance. In FIG. 3B the illustrated example shows the cumulative load balance is 15% 3G, 50% LTE, and 35% Internet, which is within an acceptable range, and much more balanced than when both tenant-A 304 and tenant-B 306 were both using hash algorithm A. Additionally, although not shown, in some examples, the context aware flow load balancing unit 308 may also apply a new flow hashing algorithm to tenant-A that may further balance the cumulative egress traffic load of multi-tenant edge device 302, based on the statistical model calculated for each hash algorithm that is available for tenant-A 304.

It is worth noting, that the flow hash load balance of one tenant does not simply affect that tenant, but can also affect the other tenant(s). Thus, even when different flow hash algorithm per tenant yields an acceptable load balance per tenant, cumulative load balance may still be unacceptable, or less than desirable, as changing one tenant's flow hashing algorithm may affect other tenants link utilization. Additionally, the ingress traffic patterns of tenants may change over time, and this may result in changing flow hash load balances that are unacceptable.

Figure 4A:
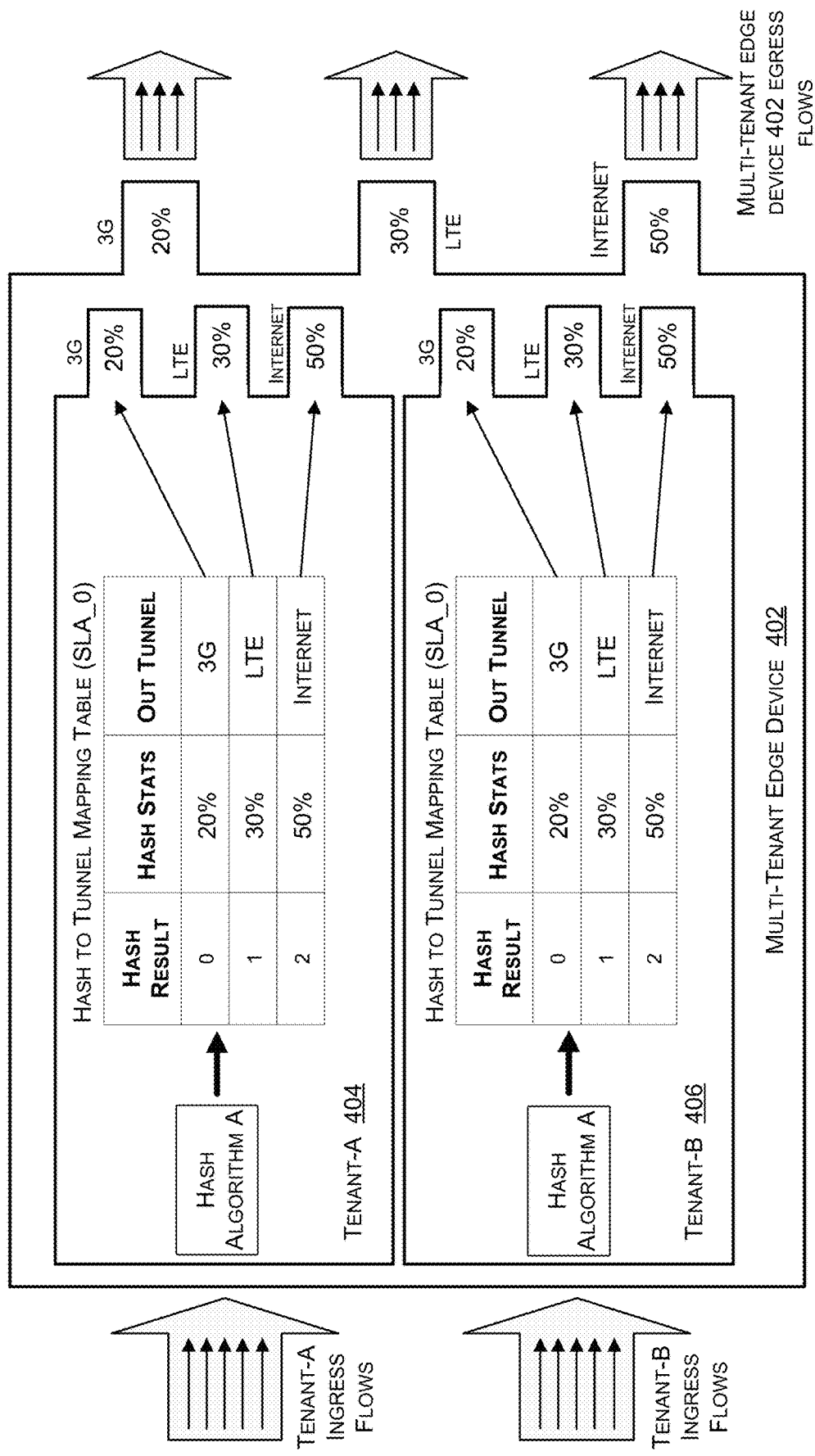
FIG. 4A illustrates an example of a multi-tenant edge device and tenant hash to tunnel mapping tables.
Figure 4B:
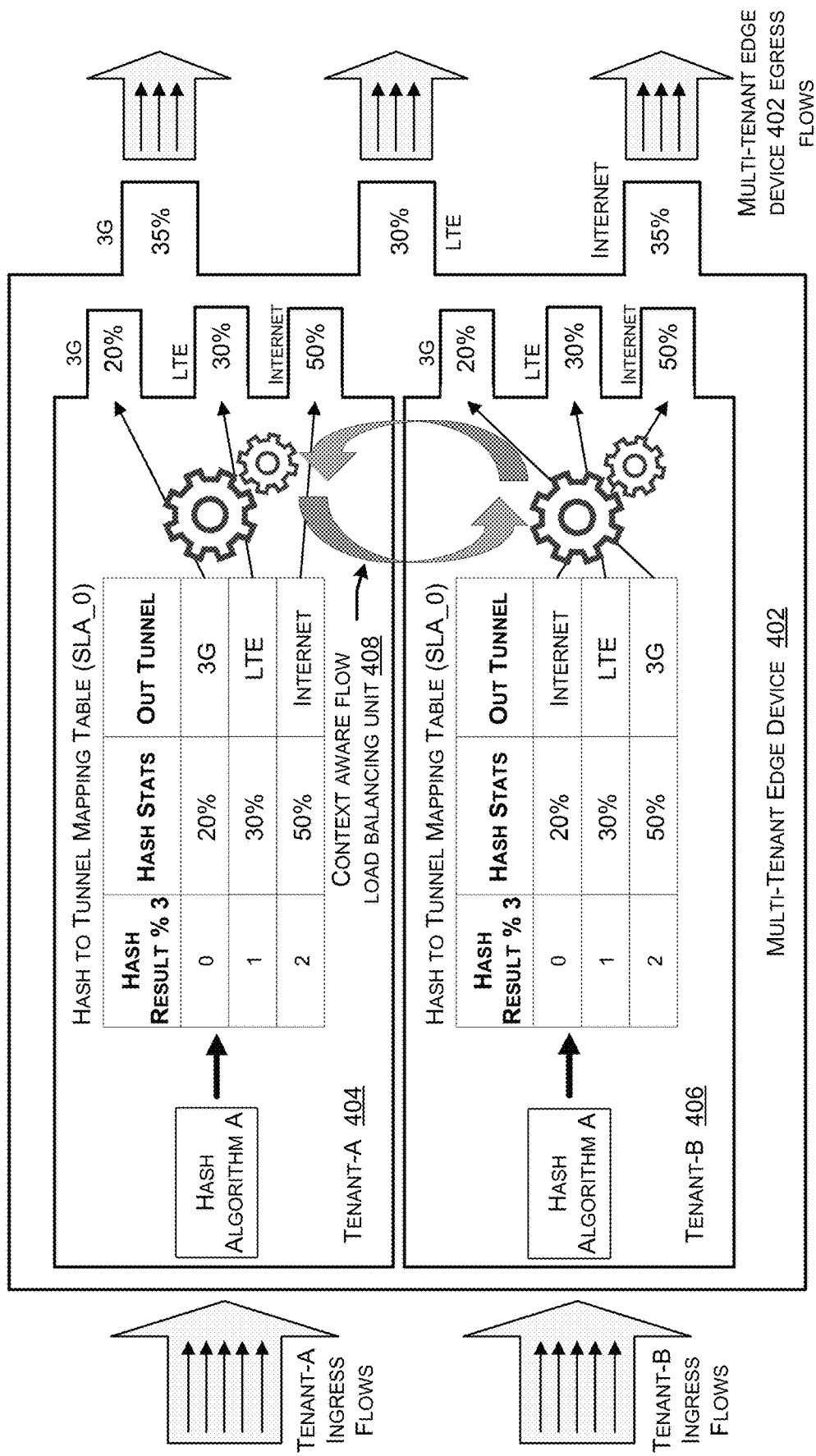
FIG. 4B illustrates an example of a multi-tenant edge device with a context aware flow load balancing unit.

FIG. 4A illustrate an example is which a multi-tenant edge device is experiencing a load balance that while within an acceptable range, is less than optimal, and may be easily improved through context aware flow load balancing, and FIG. 4B illustrates the same multi-tenant edge device after context aware flow load balancing, resulting in a cumulative load balance for the multi-tenant edge device within a much more optimal range.

In FIG. 4A multi-tenant edge device 402 has two tenants onboard, tenant-A 404 and tenant-B 406. Tenant-A 304 is using hash algorithm A on incoming packet parameters to determine an egress transport link, which will be either 3G, LTE, or Internet per the resource profile associated with tenant-A 304 as described above with reference to FIG. 1 and FIG. 2. When incoming packets are hashed using algorithm A, the final hash result is reduced to a number of bits corresponding to the number of outgoing transport tunnels. These final unique numbers are assigned a predetermined available transport tunnel as shown in the "Hash to Tunnel Mapping Table" for tenant-A 404. Based on the results of hash algorithm A, and the hash to tunnel mapping the load balance of tenant-A 404 traffic is 20% 3G, 30% LTE, and 50% Internet. This is an acceptable load balance, if not ideal. Tenant-B 406 is also using hash algorithm A (note: this is merely an example and tenant-B 406 may initially use a same or different hash algorithm than tenant-A 404, resulting in load balance issues, and requiring similar load balancing solutions) on incoming packet parameters to determine an egress transport link according to the "Hash to Tunnel Mapping Table" for Tenant-B 406. Thus, the load balance of tenant-B 406 traffic is 20% 3G, 40% LTE, and 50% Internet. This may be within an acceptable range, but not ideal. Thus, the cumulative load balance for multi-tenant edge device 402 is 20% 3G, 30% LTE, and 50% Internet. Again, this may be acceptable, however, not optimal.

FIG. 4B illustrates a context aware flow load balancing unit 408 that may be used to automatically applying flow hashing algorithms per tenant in a multi-tenant environment, as well as calculate all permutation combinations of the hash to tunnel mapping table, to achieve an optimal load balance per device in the SD-WAN network. The context aware flow hashing unit 408 of multi-tenant edge device 402 will calculate all permutation combinations of hash to tunnel mapping table's hash stat values across tenants to determine if there is a better arrangement of hash to tunnel mappings for each tenant that results in a better, or optimal, cumulative load balance for the multi-tenant edge device 402. Over a predetermined time period the context aware flow hashing unit 408 of the multi-tenant edge device 402 will collect sufficient data to determine the best suitable, or optimal, flow hashing algorithm and the optimal hash to tunnel mapping for the hashing algorithm, for each tenant that will result in a cumulative load balance at the device level that approaches an equal balance of egress traffic for each transport interface. In the example illustrated in FIG. 4B, by simply re-arranging the hash to tunnel mapping of tenant-B 406, multi-tenant edge device 302 can achieve a much more balanced cumulative load balance. In FIG. 4B the illustrated example shows the hash to tunnel mapping of 3G and Internet for tenant-B 406 swapped. By simply swapping these mappings of tenant-B 406, the cumulative load for multi-tenant edge device 402 becomes and optimal 35% 3G, 30% LTE, and 35% Internet.

Figure 5:
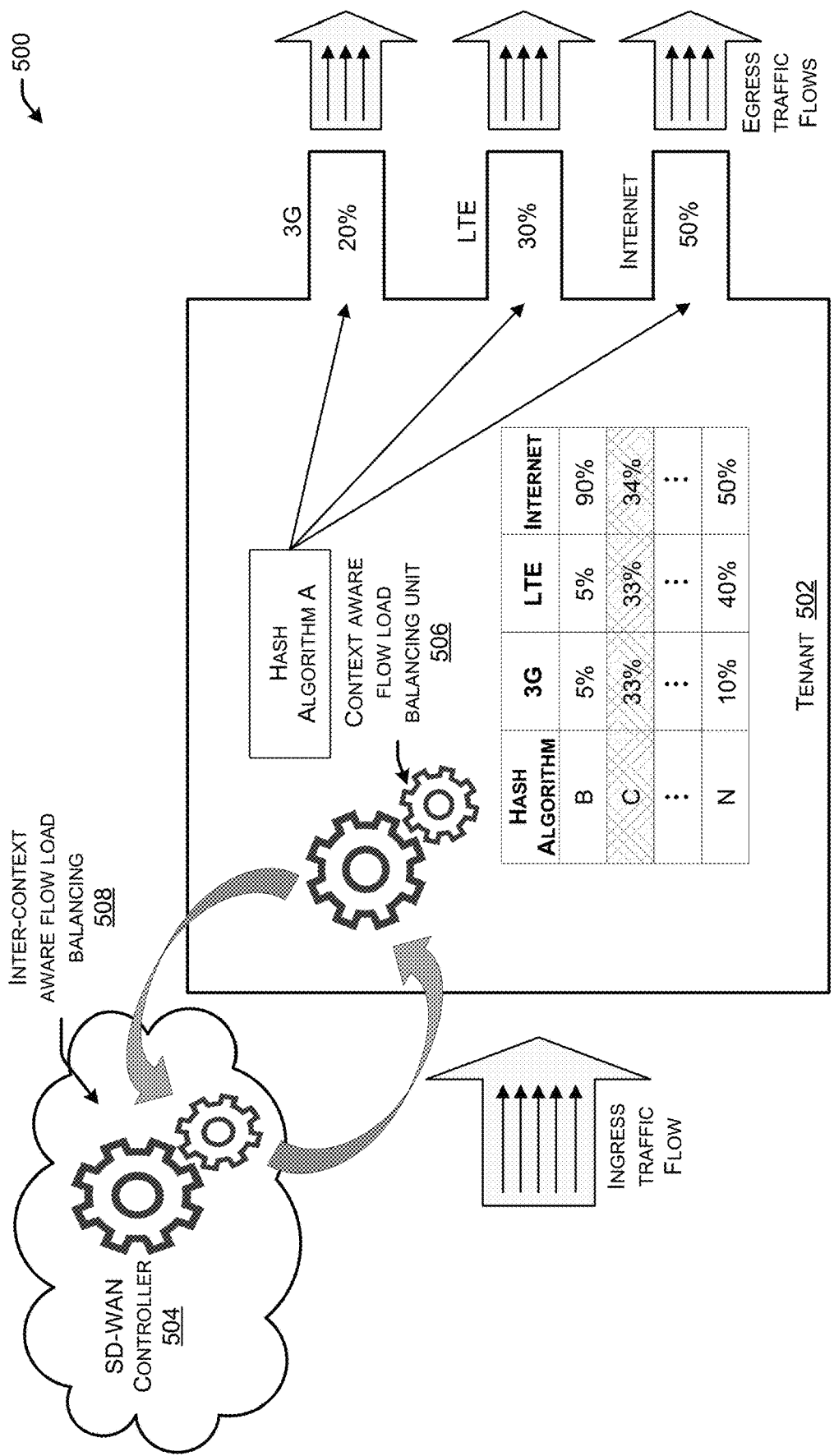
FIG. 5 illustrates an example environment that may implement various aspects of the technologies directed to inter-context aware flow load balancing.

FIG. 5 illustrates an example environment 500 that may implement various aspects of the technologies directed to inter-context aware flow load balancing. Example environment 500 includes a tenant 502. Tenant 502 is shown onboard a single tenant edge device: however, this is merely for explanation purposes and the same techniques apply to a tenant onboard a multi-tenant edge device of an SD-WAN. Environment 500 also include SD-WAN controller 504. Tenant 502 is using hash algorithm A to determine the egress transport interface for packets. Typically, when a tenant is onboarded to an edge device of an SD-WAN, the user, or tenant may choose which algorithm of available algorithms, that they prefer. Assuming, that the chosen algorithm results in an acceptable load balance of flows, the tenant will keep the chosen algorithm and never change it. However, the choice of algorithms is based on basic knowledge and in a live network there is no feedback to gather information from, and choosing an optimal hash algorithm is difficult if not impossible. In addition, even when a chosen algorithm is currently ideal, the ingress traffic patterns can change over time and the load balance may become unacceptable. However, using technique described here, inter-context aware load balancing may automatically recommend, or implement the best suited or optimal algorithm for a load balance approaching equality for an edge device in the SD-WAN, as well as automatically update to a new; more optimized, algorithm when changing ingress traffic patterns render the current algorithm unacceptable, or even less than optimal.

In environment 500, Hash algorithm A results in a load balance of 20% 3G, 30% LTE, and 50% Internet. While this load balance is acceptable, it is not optimal. However, tenant 502 may use the context aware flow load balancing unit 506 to implement an optimal flow hashing algorithm. At the same time that incoming packets are hashed according to the flow hashing algorithm being used to determine an egress transport interface, a context aware flow load balancing unit 506 of the edge device is running in parallel. The context aware flow load balancing unit 506 will periodically sample the input traffic of a tenant (for example sampling traffic can be done in an exponential backoff method, or any other appropriate method) and use the packet parameters to calculate the hash results for other supported flow hashing algorithms and build a statistical model of them. As shown in FIG. 5, in addition to hash algorithm A, the edge device supports hash algorithms B-N. Over a predetermined time period the context aware flow load balancing unit 506 of the edge device will collect sufficient data to determine the best suitable flow hashing algorithm and an optimal hash to tunnel mapping table for each tenant.

Additionally, the data may be sent to the SD-WAN controller 504 which may run an inter-context aware flow load balancing 508 at a network level and over a period of time (e.g., six months) the SD-WAN controller 504 may rank all supported algorithms for each tenant onboard each edge device and determine the optimal algorithm and optimal hash to tunnel table arrangement for every tenant onboard every edge device in the SD-WAN. During a maintenance window; the SD-WAN controller 504 may apply the optimal algorithm (assuming a change in algorithm for optimization) to each tenant and/or an optimal hash to tunnel table arrangement for the optimal algorithm (again, assuming a change in table arrangement for optimization). As shown in FIG. 5 algorithm C is a more optimal flow hashing algorithm than the currently used hash algorithm A. Thus, during a maintenance window; the SD-WAN controller may apply hash algorithm C to tenant 502. Alternately or in addition, the SD-WAN controller 504 may inform tenants of the optimal algorithm and table arrangement and let the tenant take further action if desired. In this way, the choice of algorithm and hash to tunnel table arrangement can be continuously changed based on the dynamics of the tenants and input traffic patterns.

Figure 6:
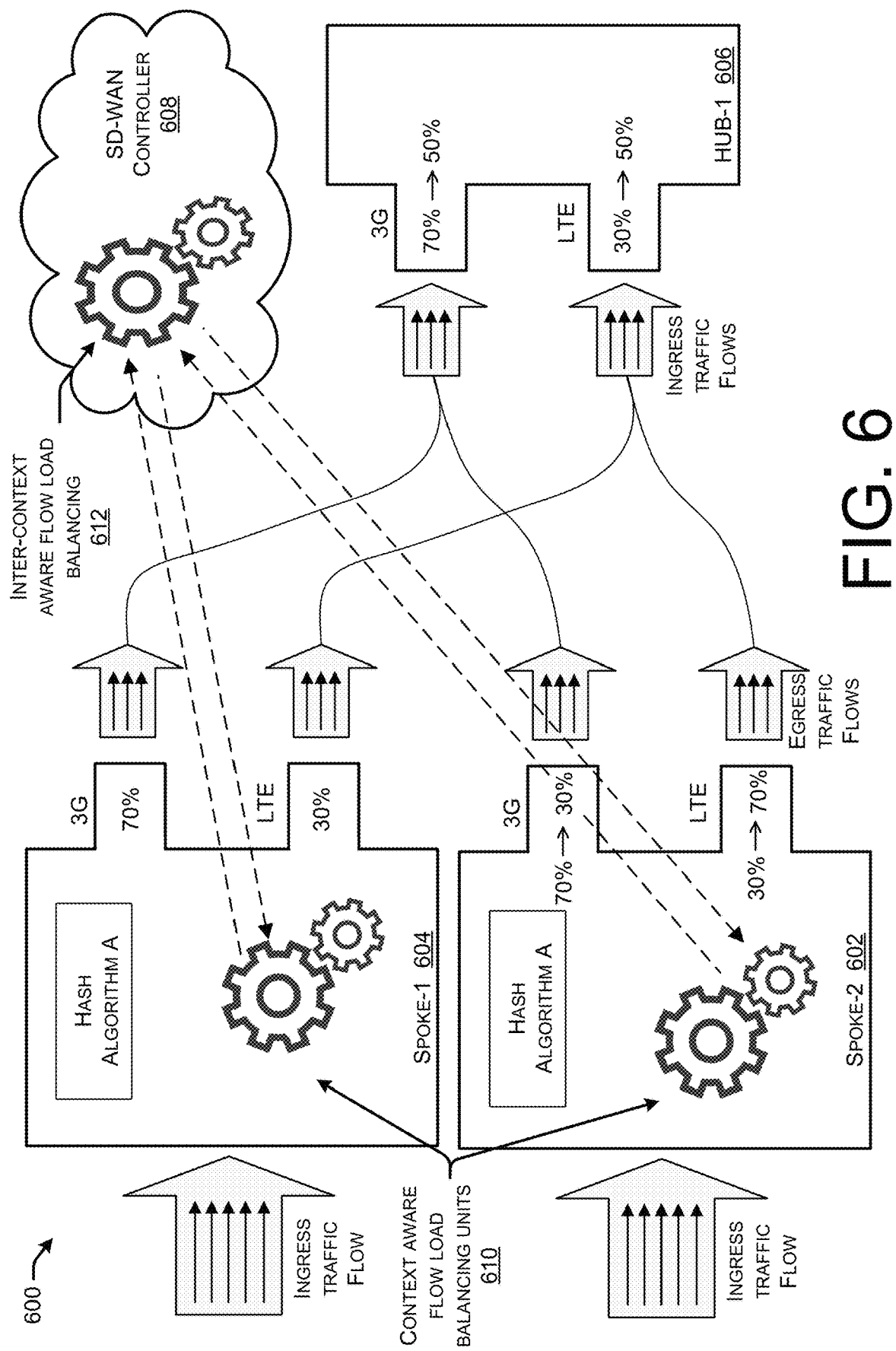
FIG. 6 illustrates an example environment that may implement various aspects of the technologies directed to inter-context aware flow load balancing.

FIG. 6 illustrates an example environment that may implement various aspects of the technologies directed to inter-context aware flow load balancing. Similar to FIG. 5, FIG. 6 illustrates an example environment 600 for load balancing at a network level by an SD-WAN controller. Environment 600 include two spoke routers (spoke-1 602 and spoke-2 604) and one hub device (HUB-1 606) and an SD-WAN controller 608. Spoke-1 604 is using transport links 3G and LTE. Hash algorithm A is being used and this results in a load balance of 70% 3G and 30% LTE. Spoke-2 606 is also using transport links 3G and LTE. Hash algorithm A is also being used on spoke-2 606 resulting in an initial load balance of 70% 3G and 30% LTE. FIG. 6 illustrates 3G from egress traffic from spoke-1 602 and spoke-2 604 flowing exclusively to the 3G ingress port of HUB-1 606, and similarly, LTE egress traffic for the spokes exclusively going to the LTE ingress port of HUB-1 606. However, this is merely for ease of explanation and should not be considered limiting. Thus, the cumulative ingress split for HUB-1 606 is 70% 3G and 30% LTE. While this split may be acceptable, it is not optimal. Context aware flow load balancing units 610 at spoke-1 602 and spoke-2 604 may export their respective hash stats and current hash to tunnel mapping to the inter-context aware flow load balancing 612 of the SD-WAN controller 608. Load balancing may then be determined at a network level and all permutation combinations of algorithms and hash to tunnel mapping tables across tenants may be calculate to determine if there is a more optimal way to achieve provider level flow load balancing. In FIG. 6, if the hash to tunnel mapping of spoke-2 602 is simply reversed, the egress traffic will become 30% 3G and 70% LTE, which will result in a total ingress traffic split of 50% 3G and 50% LTE at HUB-1 606, which is an optimal split.

FIG. 7 is a flow diagram illustrating an example method 700 associated with the techniques described herein for automatically providing per tenant weighted ECMP over shared transport interfaces in a multi-tenant SD-WAN. Example method 700 illustrates aspects of the functions performed by the multi-tenant edge device 102 and multi-tenant edge device 104 as described in FIG. 1 and functions performed by an SD-WAN controller 202 via an SD-WAN controller dashboard 200 if FIG. 2. The logical operations described herein with respect to FIG. 7 may be implemented (1) as a sequence of computer-implemented acts or program modules running on a computing system and/or (2) as interconnected machine logic circuits or circuit modules within the computing system. In some examples, the method (s) 700 may be performed by a system comprising one or more processors and one or more non-transitory computer-readable media storing computer-executable instructions that, when executed by the one or more processors, cause the one or more processors to perform the method(s) 700.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 7 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 702, a resource profile associated with a tenant is determined. The resource profile defines a customizable traffic allowance per transport interface for the tenant on the local multi-tenant edge device. For example, FIG. 2 illustrates a resource profile for tenant-A being created. The traffic allowance for tenant-A is defined as 10 Mbps on biz-internet and 15 Mbps on 3G. With reference to FIG. 1, the bandwidth per tenant per interface for both multi-tenant edge device 102 and multi-tenant edge device 104 are shown for both MPLS and LTE.

At operation 704, the tenant is onboarded to the local multi-tenant edge device according to the resource profile. For example, in FIG. 1 at (1) the SD-WAN controller 112 onboards tenant-A 106 and tenant-B to both multi-tenant edge device 102 and multi-tenant edge device 104 according to their respective resource profiles. In another example, tenant-A is onboarded to a multi-tenant edge device according to the resource profile added via the add resource pop-up window 204 of the SD-WAN controller dashboard 200 of FIG. 2.

At operation 706, the local weight per transport interface is applied to respective transport interfaces of the local multi-tenant edge device. For example, FIG. 1 illustrates the weight applied per transport interface (MPLS and LTE) for tenant-A 106 and tenant-B 108 on both multi-tenant edge device 102 and multi-tenant edge device 104.

At operation 708, information including the local weight per transport interface of the local multi-tenant edge device for the tenant is transmitted to a remote multi-tenant edge device via the SD-WAN controller. For example, as shown in FIG. 1 at (3) multi-tenant edge device 102 transmits its local weight per transport interface per tenant to multi-tenant edge device 104 via the SD-WAN controller 112. In some examples, the local weight per transport interface information may be transmitted as a TLOC advertisement.

At operation 710, the local multi-tenant edge device receives information including a remote weight per transport interface of the remote multi-tenant edge device for the tenant from the remote multi-tenant edge device via the SD-WAN controller. Similar to the example above at operation 708, in FIG. 1 at (3) multi-tenant edge device 104 transmits its local weight per transport interface per tenant to multi-tenant edge device 102 via the SD-WAN controller 112.

At operation 712, the traffic is routed from the tenant based at least in part on the local weight per transport interface of the local multi-tenant edge device and the remote weight per transport interface of the remote multi-tenant edge device. For example, in FIG. 1 at (4) the traffic routed from tenants based on the local weights per interface of multi-tenant edge device 102 and remote weights per interface of multi-tenant edge device 104. Note, the transport links illustrated in FIG. 1 (MPLS to MPLS, MPLS to LTE, LTE to MPLE, and LTE to LTE) are shared between tenant-A 106 and tenant-B 108.

FIG. 8 is a flow diagram illustrating an example method 800 associated with the techniques described herein for automatically providing per tenant weighted ECMP over shared transport interfaces in a multi-tenant SD-WAN. Example method 800 illustrates aspects of the functions performed by tenant 502 as described with reference to FIG. 5. The logical operations described herein with respect to FIG. 8 may be implemented (1) as a sequence of computer-implemented acts or program modules running on a computing system and/or (2) as interconnected machine logic circuits or circuit modules within the computing system. In some examples, the method(s) 800 may be performed by a system comprising one or more processors and one or more non-transitory computer-readable media storing computer-executable instructions that, when executed by the one or more processors, cause the one or more processors to perform the method(s) 800.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIG. 8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 802 assign a first flow hashing algorithm to the tenant when the tenant is onboarded to the local multi-tenant edge device. For example, FIG. 5 shows tenant 502 is assigned hash algorithm A as a default flow-hashing algorithm when tenant 502 is onboarded. The user, or tenant may choose the default flow hashing algorithm.

At operation 804, based at least in part on applying the first flow hashing algorithm to tenant ingress traffic, determine a first load balance of egress traffic for the tenant on individual transport interfaces of the local multi-tenant edge device. For example, FIG. 5 show the load balance of tenant 502 as 20% 3G, 30% LTE, and 50% Internet. This load balance may be acceptable, but not optimal.

At operation 806 calculate, by a context aware flow load balancing unit of the local multi-tenant edge device, a second load balance of egress traffic for a second flow hashing algorithm available to the local multi-tenant edge device. For example, in FIG. 5 the context aware flow load balancing unit 506 calculates load balances for hash algorithms B-N as shown.

At operation 808 determine, based at least in part on the first load balance and the second load balance, whether the first flow hashing algorithm or the second flow hashing algorithm is optimal. For example, in FIG. 5 the load balances for the other available flow hashing algorithms are shown, hash algorithms B and N are less optimal than hash algorithm A, however, hash algorithm C is more optimal than hash algorithm A.

At operation 810 based on the first flow hashing algorithm being optimal, continue to apply the first flow hashing algorithm to the tenant ingress traffic on the local multi-tenant edge device. For example, FIG. 5 shows hash algorithm A is more optimal than hash algorithm B and N. Assuming hash algorithm C is not available, hash algorithm A would continue to be applied.

At operation 812 based on the second flow hashing algorithm being optimal, apply the second flow hashing algorithm to the tenant ingress traffic on the local multi-tenant edge device. For example, is FIG. 5, hash algorithm C would be applied as it is a better balance than hash algorithm A.

Figure 9:
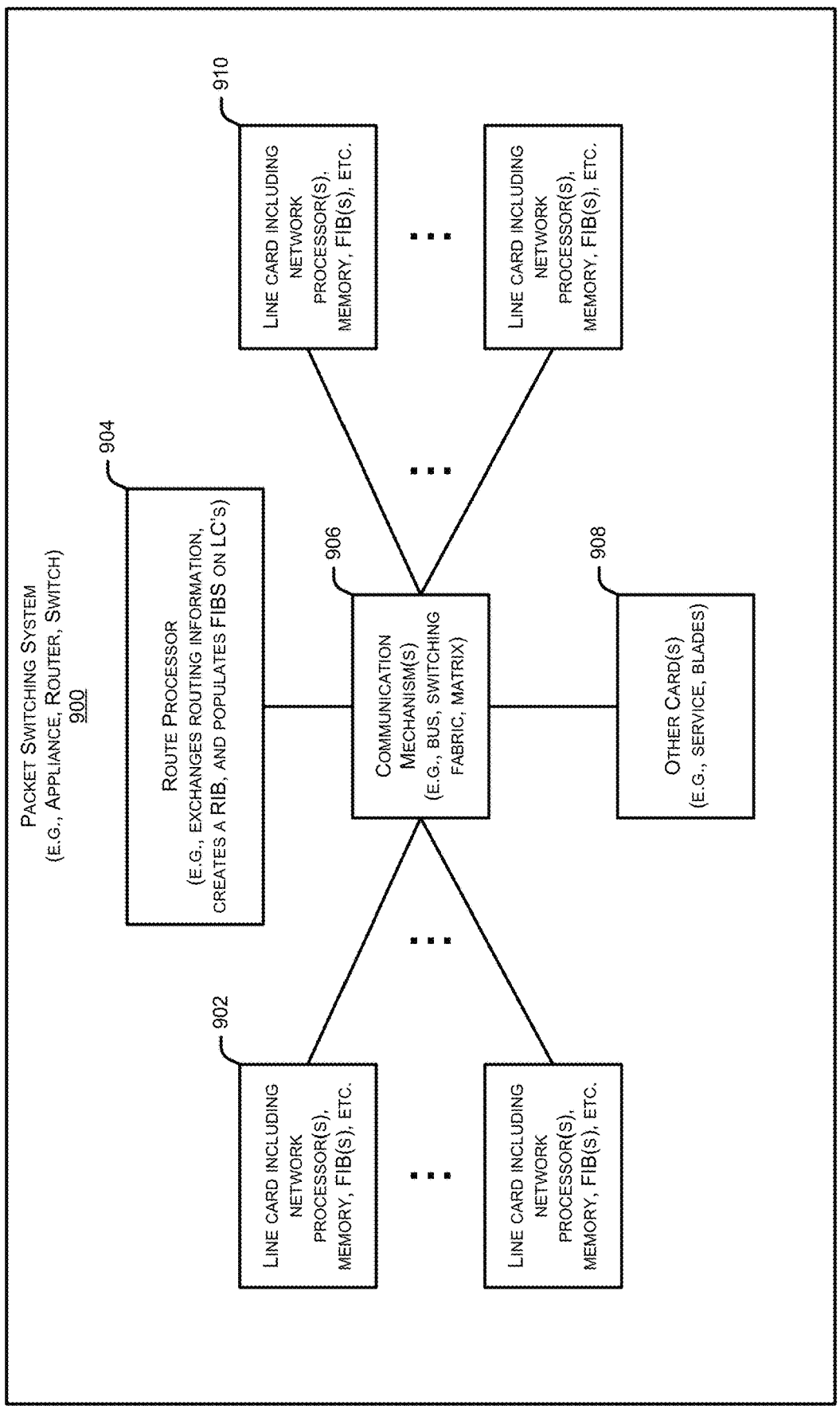
FIG. 9 illustrates a block diagram illustrating an example packet switching system that can be utilized to implement various aspects of the technologies disclosed herein.

FIG. 9 illustrates a block diagram illustrating an example packet switching device (or system) 900 that can be utilized to implement various aspects of the technologies disclosed herein. In some examples, packet switching device(s) 900 may be employed in various networks, such as, for example, multi-tenant edge device 102 and multi-tenant edge device 104 described with respect to FIG. 1.

In some examples, a packet switching device 900 may comprise multiple line card(s) 902, 910, each with one or more network interfaces for sending and receiving packets over communications links (e.g., possibly part of a link aggregation group). The packet switching device 900 may also have a control plane with one or more processing elements for managing the control plane and/or control plane processing of packets associated with forwarding of packets in a network. The packet switching device 900 may also include other cards 908 (e.g., service cards, blades) which include processing elements that are used to process (e.g., forward/send, drop, manipulate, change, modify, receive, create, duplicate, apply a service) packets associated with forwarding of packets in a network. The packet switching device 900 may comprise hardware-based communication mechanism 906 (e.g., bus, switching fabric, and/or matrix, etc.) for allowing its different entities, line cards 902, 904, 908 and 910 to communicate. Line card(s) 902, 910 may typically perform the actions of being both an ingress and/or an egress line card 902, 910, in regard to multiple other particular packets and/or packet streams being received by, or sent from, packet switching device 900.

Figure 10:
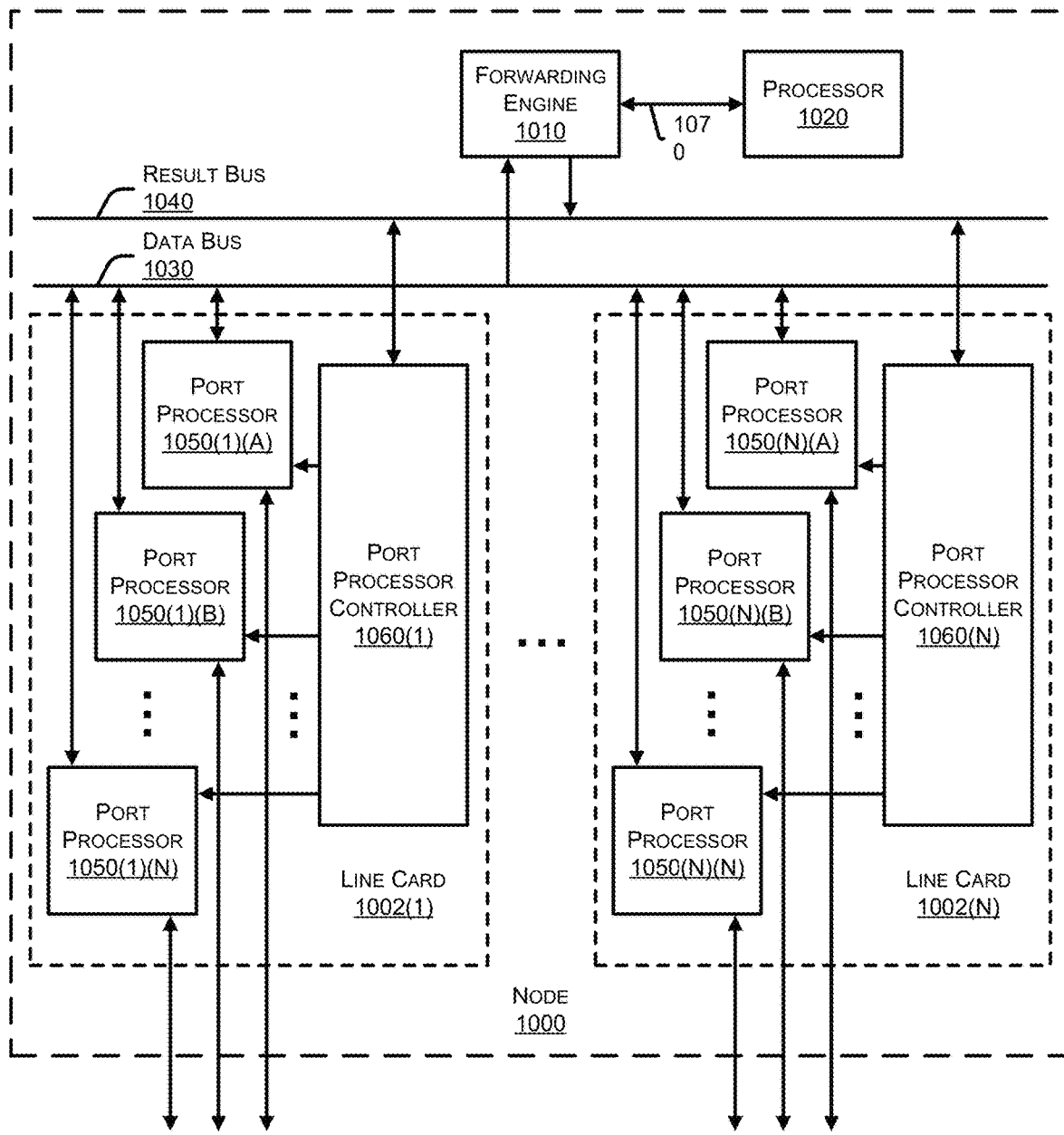
FIG. 10 illustrates a block diagram illustrating certain components of an example node that can be utilized to implement various aspects of the technologies disclosed herein.

FIG. 10 illustrates a block diagram illustrating certain components of an example node 1000 that can be utilized to implement various aspects of the technologies disclosed herein. In some examples, node(s) 1000 may be employed in various networks, such as, for example, the SD-WAN as described with respect to FIG. 1.

In some examples, node 1000 may include any number of line cards 1002 (e.g., line cards 1002(1)-(N), where N may be any integer greater than 1) that are communicatively coupled to a forwarding engine 1010 (also referred to as a packet forwarder) and/or a processor 1020 via a data bus 1030 and/or a result bus 1040. Line cards 1002(1)-(N) may include any number of port processors 1050(1)(A)-(N)(N) which are controlled by port processor controllers 1060(1)-(N), where N may be any integer greater than 1. Additionally, or alternatively, forwarding engine 1010 and/or processor 1020 are not only coupled to one another via the data bus 1030 and the result bus 1040, but may also communicatively coupled to one another by a communications link 1070.

The processors (e.g., the port processor(s) 1050 and/or the port processor controller(s) 1060) of each line card 1002 may be mounted on a single printed circuit board. When a packet or packet and header are received, the packet or packet and header may be identified and analyzed by node 1000 (also referred to herein as a router) in the following manner. Upon receipt, a packet (or some or all of its control information) or packet and header may be sent from one of port processor(s) 1050(1)(A)-(N)(N) at which the packet or packet and header was received and to one or more of those devices coupled to the data bus 1030 (e.g., others of the port processor(s) 1050(1)(A)-(N)(N), the forwarding engine 1010 and/or the processor 1020). Handling of the packet or packet and header may be determined, for example, by the forwarding engine 1010. For example, the forwarding engine 1010 may determine that the packet or packet and header should be forwarded to one or more of port processors 1050(1)(A)-(N)(N). This may be accomplished by indicating to corresponding one(s) of port processor controllers 1060(1)-(N) that the copy of the packet or packet and header held in the given one(s) of port processor(s) 1050 (1)(A)-(N)(N) should be forwarded to the appropriate one of port processor(s) 1050(1)(A)-(N)(N). Additionally, or alternatively, once a packet or packet and header has been identified for processing, the forwarding engine 1010, the processor 1020, and/or the like may be used to process the packet or packet and header in some manner and/or may add packet security information in order to secure the packet. On a node 1000 sourcing such a packet or packet and header, this processing may include, for example, encryption of some or all of the packets or packet and header's information, the addition of a digital signature, and/or some other information and/or processing capable of securing the packet or packet and header. On a node 1000 receiving such a processed packet or packet and header, the corresponding process may be performed to recover or validate the packets or packet and header's information that has been secured.

Figure 11:
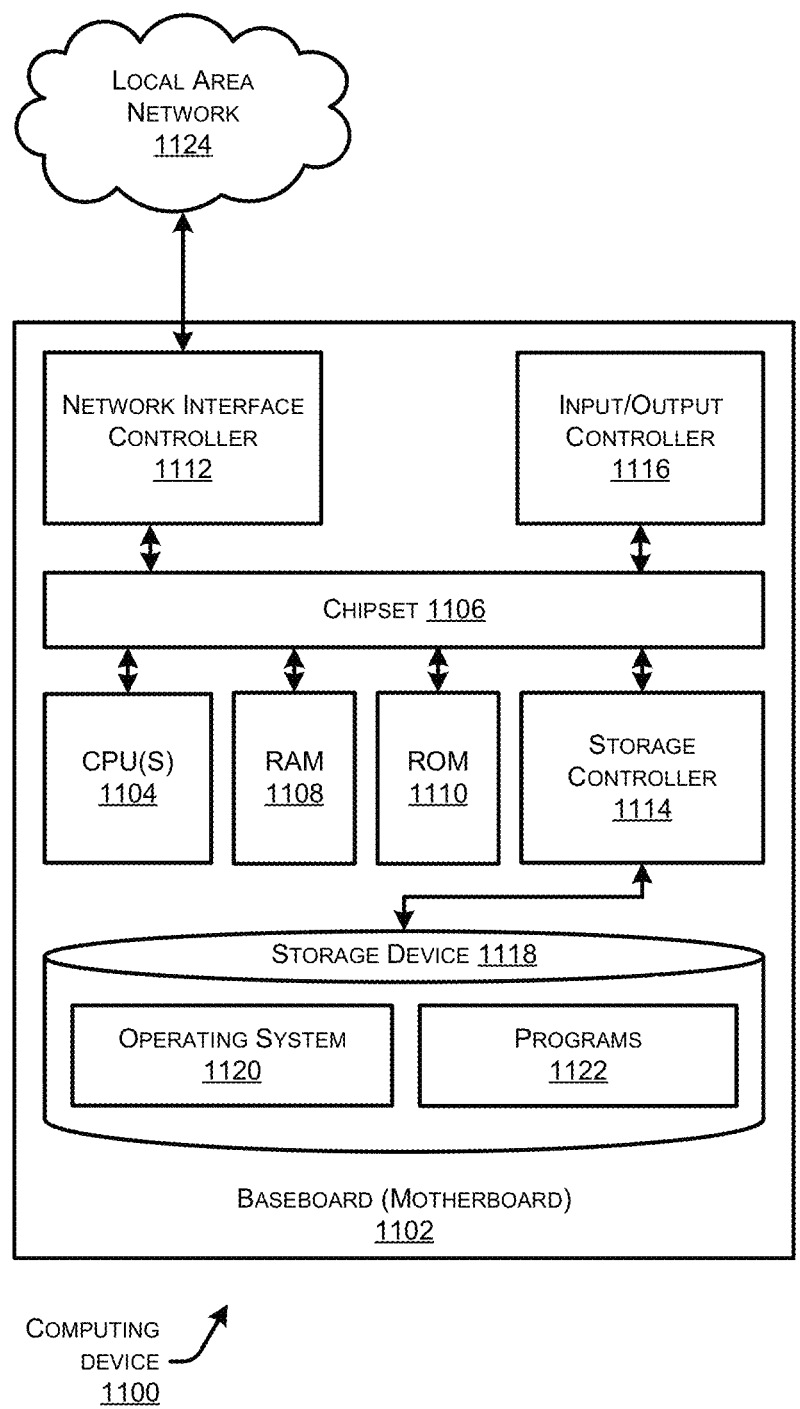
FIG. 11 is a computer architecture diagram showing an illustrative computer hardware architecture for implementing a server device that can be utilized to implement aspects of the various technologies presented herein.

FIG. 11 shows an example computer architecture for a computing device (or network routing device) 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. The computing device 1100 may, in some examples, correspond to an SD-WAN network controller 112, 202, 504 or 608, the packet switching system 900, and/or the node 1000 described herein with respect to FIGS. 1, 3, 5, 6, 9 and 10, respectively.

The computing device 1100 includes a baseboard 1102, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computing device 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computing device 1100. The chipset 1106 can further provide an interface to a computer-readable storage medium such as a read-only memory ("ROM") 1110 or non-volatile RAM ("NVRAM") for storing basic routines that help to startup the computing device 1100 and to transfer information between the various components and devices. The ROM 1110 or NVRAM can also store other software components necessary for the operation of the computing device 1100 in accordance with the configurations described herein.

The computing device 1100 can operate in a networked environment using logical connections to remote computing devices and computer systems through a network, such as the network 1124. The chipset 1106 can include functionality for providing network connectivity through a NIC 1112, such as a gigabit Ethernet adapter. The NIC 1112 is capable of connecting the computing device 1100 to other computing devices over the network 1124. It should be appreciated that multiple NICs 1112 can be present in the computing device 1100, connecting the computer to other types of networks and remote computer systems.

The computing device 1100 can be connected to a storage device 1118 that provides non-volatile storage for the computing device 1100. The storage device 1118 can store an operating system 1120, programs 1122, and data, which have been described in greater detail herein. The storage device 1118 can be connected to the computing device 1100 through a storage controller 1114 connected to the chipset 1106. The storage device 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computing device 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 can further read information from the storage device 1118 by detecting the physical states or characteristics of one or more particular locations within the physical storage units.

In addition to the mass storage device 1118 described above, the computing device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 1100. In some examples, the operations performed by the multi-tenant edge devices 102 and 104, the SD-WAN controller(s) 112, and or any components included therein, may be supported by one or more devices similar to computing device 1000. Stated otherwise, some or all of the operations performed by the multi-tenant edge devices 102 and 104, the SD-WAN controller(s) 112 and or any components included therein, may be performed by one or more computing device 1100 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computing device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1118 can store other system or application programs and data utilized by the computing device 1100.

In one embodiment, the storage device 1118 or other computer-readable storage media is encoded with computer-executable instructions which, when loaded into the computing device 1100, transform the computer from a general-purpose computing system into a special-purpose computer capable of implementing the embodiments described herein. These computer-executable instructions transform the computing device 1100 by specifying how the CPUs 1104 transition between states, as described above. According to one embodiment, the computing device 1100 has access to computer-readable storage media storing computer-executable instructions which, when executed by the computing device 1100, perform the various processes described above with regard to FIG. 7 and FIG. 8. The computing device 1100 can also include computer-readable storage media having instructions stored thereupon for performing any of the other computer-implemented operations described herein.

The computing device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computing device 1100 might not include all of the components shown in FIG. 11, can include other components that are not explicitly shown in FIG. 11, or might utilize an architecture completely different than that shown in FIG. 11.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method, performed at least in part by a local multi-tenant edge device, for providing per tenant weighted equal-cost multi-path (ECMP) routing over shared transport interfaces in a multiple tenant SD-WAN, the method comprising:
   determining a resource profile associated with a tenant, wherein the resource profile defines a customizable traffic allowance per transport interface for the tenant on the local multi-tenant edge device;
   onboarding the tenant to the local multi-tenant edge device according to the resource profile;
   calculating, based at least in part of the resource profile, a local weight per transport interface for individual transport interfaces for which the tenant is allowed to transmit traffic from the local multi-tenant edge device;
   applying the local weight per transport interface to respective transport interfaces of the local multi-tenant edge device;
   transmitting, to a remote multi-tenant edge device and via an SD-WAN controller, information including the local weight per transport interface of the local multi-tenant edge device for the tenant;
   receiving, from the remote multi-tenant edge device and via the SD-WAN controller, information including a remote weight per transport interface of the remote multi-tenant edge device for the tenant; and
   routing traffic from the tenant based at least in part on the local weight per transport interface of the local multi-tenant edge device and the remote weight per transport interface of the remote multi-tenant edge device.

2. The method of claim 1, wherein calculating a local weight per transport interface for individual transport interfaces of a local multi-tenant edge device is based at least in part on a re-usable tenant tiering profile comprising:
   transport interfaces the tenant is allowed to use; and
   bandwidth the tenant is allowed on individual transport interfaces the tenant is allowed to use.

3. The method of claim 1, wherein onboarding the tenant further comprising:
   receiving, from the SD-WAN controller, a QoS for a VPN group defined for the tenant;
   monitoring QoS parameters for the VPN group on the local multi-tenant edge device;
   transmitting, to the remote multi-tenant edge device and via the SD-WAN controller, the QoS parameters for the VPN group on the local multi-tenant edge device;
   receiving, from the remote multi-tenant edge device and via the SD-WAN controller, QoS parameters for the VPN group on the remote multi-tenant edge device; and
   routing traffic from the tenant based at least in part on the QoS parameters for the VPN group on the local multi-tenant edge device and QoS parameters for the VPN group on the remote multi-tenant edge device.

4. The method of claim 3, further comprising creating a new VPN on the local multi-tenant edge device for the tenant and automatically adding the new VPN to the VPN group for the tenant.

5. The method of claim 1, wherein information including the local weight per transport interface of the local multi-tenant edge device for the tenant is transmitted as part of a Transport Locator (TLOC) advertisement.

6. The method of claim 1, wherein the tenant is a first tenant and further comprising, onboarding a second tenant to the local multi-tenant edge device according to a second resource profile, wherein onboarding the second tenant to the local multi-tenant edge device comprises sharing bandwidth of individual transport interfaces of the local multi-tenant edge device with the first tenant.

7. The method of claim 6, further comprising maximizing available bandwidth for the first tenant and the second tenant across individual transport interfaces of the local multi-tenant edge device by automatically adjusting first local weights for individual transport interfaces for the first tenant and second local weights for individual transport interfaces for the second tenant on the local multi-tenant edge device.

8. The method of claim 7, wherein automatically adjusting weights for individual transport interfaces on the local multi-tenant edge device for a tenant further comprises:
assigning a first flow hashing algorithm to the tenant when the tenant is onboarded to the local multi-tenant edge device;
based at least in part on applying the first flow hashing algorithm to tenant ingress traffic, determining a first load balance of egress traffic for the tenant on individual transport interfaces of the local multi-tenant edge device;
calculating, by a context aware flow load balancing unit of the local multi-tenant edge device, a second load balance of egress traffic for a second flow hashing algorithm available to the local multi-tenant edge device;
determining, based at least in part on the first load balance and the second load balance, whether the first flow hashing algorithm or the second flow hashing algorithm is optimal;
based on the first flow hashing algorithm being optimal, continue applying the first flow hashing algorithm to the tenant ingress traffic on the local multi-tenant edge device; and
based on the second flow hashing algorithm being optimal, applying the second flow hashing algorithm to the tenant ingress traffic on the local multi-tenant edge device.

9. The method of claim 8, wherein the tenant is a first tenant and further comprising one or more additional tenants onboard the local multi-tenant edge device.

10. The method of claim 8, further comprising determining an optimal hash to tunnel table mapping for the first flow hashing algorithm and the second flow hashing algorithm.

11. The method of claim 8, further comprising transmitting, by the context aware flow load balancing unit and to the SD-WAN controller, the first load balance and the second load balance, such that the SD-WAN controller can rank individual supported flow hashing algorithms for individual tenants on board individual network devices and provide suggestions for an optimal flow hashing algorithm for individual tenants across the SD-WAN to optimize traffic flows at a network level.

12. A system comprising:
one or more processors; and
one or more computer-readable media storing computer-executable instructions that, when executed by the one or more processors, cause the one or more processors to perform operations comprising:
determining a resource profile associated with a tenant, wherein the resource profile defines a customizable traffic allowance per transport interface for the tenant on a local multi-tenant edge device;
onboarding the tenant to the local multi-tenant edge device according to the resource profile;
calculating, based at least in part of the resource profile, a local weight per transport interface for individual transport interfaces for which the tenant is allowed to transmit traffic from the local multi-tenant edge device;
applying the local weight per transport interface to respective transport interfaces of the local multi-tenant edge device;
transmitting, to a remote multi-tenant edge device and via an SD-WAN controller, information including the local weight per transport interface of the local multi-tenant edge device for the tenant;
receiving, from the remote multi-tenant edge device and via the SD-WAN controller, information including a remote weight per transport interface of the remote multi-tenant edge device for the tenant; and
routing traffic from the tenant based at least in part on the local weight per transport interface of the local multi-tenant edge device and the remote weight per transport interface of the remote multi-tenant edge device.

13. The system of claim 12, wherein onboarding the tenant further comprises:
receiving, from the SD-WAN controller, a QoS for a VPN group defined for the tenant;
monitoring QoS parameters for the VPN group on the local multi-tenant edge device;
transmitting, to the remote multi-tenant edge device and via the SD-WAN controller, the QoS parameters for the VPN group on the local multi-tenant edge device;
receiving, from the remote multi-tenant edge device and via the SD-WAN controller, QoS parameters for the VPN group on the remote multi-tenant edge device; and
routing traffic from the tenant based at least in part on the QoS parameters for the VPN group on the local multi-tenant edge device and QoS parameters for the VPN group on the remote multi-tenant edge device.

14. The system of claim 12, wherein the tenant is a first tenant and the operations further comprising:
onboarding a second tenant to the local multi-tenant edge device according to a second resource profile; and
maximizing available bandwidth for the first tenant and the second tenant across individual transport interfaces of the local multi-tenant edge device by automatically adjusting first local weights for individual transport interfaces for the first tenant and second local weights for individual transport interfaces for the second tenant on the local multi-tenant edge device.

15. The system of claim 13, wherein automatically adjusting weights for individual transport interfaces on the local multi-tenant edge device for a tenant further comprises:
assigning a first flow hashing algorithm to the tenant when the tenant is onboarded to the local multi-tenant edge device;
based at least in part on applying the first flow hashing algorithm to tenant ingress traffic, determining a first load balance of egress traffic for the tenant on individual transport interfaces of the local multi-tenant edge device;
calculating, by a context aware flow load balancing unit of the local multi-tenant edge device, a second load balance of egress traffic for a second flow hashing algorithm available to the local multi-tenant edge device;
determining, based at least in part on the first load balance and the second load balance, whether the first flow hash algorithm or the second flow hash algorithm is optimal;
based on the first flow hashing algorithm being optimal, continue applying the first flow hashing algorithm to the tenant ingress traffic on the local multi-tenant edge device; and
based on the second flow hashing algorithm being optimal, applying the second flow hashing algorithm to the tenant ingress traffic on the local multi-tenant edge device.

16. The system of claim 14, wherein the tenant is a first tenant and further comprising one or more additional tenants onboard the local multi-tenant edge device.

17. The system of claim 15, the operations further comprising continuously monitoring ingress traffic of the local multi-tenant edge device and automatically updating, during a maintenance window, an applied flow hashing algorithm per tenant based at least in part on changes in ingress traffic patterns.

18. One or more non-transitory computer-readable media storing instructions that, when executed, cause one or more processors to perform operations comprising:
- determining a resource profile associated with a tenant, wherein the resource profile defines a customizable traffic allowance per transport interface for the tenant on a local multi-tenant edge device;
- onboarding the tenant to the local multi-tenant edge device according to the resource profile;
- calculating, based at least in part of the resource profile, a local weight per transport interface for individual transport interfaces for which the tenant is allowed to transmit traffic from the local multi-tenant edge device;
- applying the local weight per transport interface to respective transport interfaces of the local multi-tenant edge device;
- transmitting, to a remote multi-tenant edge device and via an SD-WAN controller, information including the local weight per transport interface of the local multi-tenant edge device for the tenant;
- receiving, from the remote multi-tenant edge device and via the SD-WAN controller, information including a remote weight per transport interface of the remote multi-tenant edge device for the tenant; and
- routing traffic from the tenant based at least in part on the local weight per transport interface of the local multi-tenant edge device and the remote weight per transport interface of the remote multi-tenant edge device.

19. The one or more non-transitory computer-readable media of claim 18, wherein the tenant is a first tenant and the operations further comprising:
- onboarding a second tenant to the local multi-tenant edge device according to a second resource profile; and
- maximizing available bandwidth for the first tenant and the second tenant across individual transport interfaces of the local multi-tenant edge device by automatically adjusting first local weights for individual transport interfaces for the first tenant and second local weights for individual transport interfaces for the second tenant on the local multi-tenant edge device.

20. The one or more non-transitory computer-readable media of claim 18, wherein automatically adjusting weights for individual transport interfaces on the local multi-tenant edge device for a tenant further comprises:
- assigning a first flow hashing algorithm to the tenant when the tenant is onboarded to the local multi-tenant edge device;
- based at least in part on applying the first flow hashing algorithm to tenant ingress traffic, determining a first load balance of egress traffic for the tenant on individual transport interfaces of the local multi-tenant edge device;
- calculating, by a context aware flow load balancing unit of the local multi-tenant edge device, a second load balance of egress traffic for a second flow hashing algorithm available to the local multi-tenant edge device;
- determining, based at least in part on the first load balance and the second load balance, whether the first flow hash algorithm or the second flow hash algorithm is optimal;
- based on the first flow hashing algorithm being optimal, continue applying the first flow hashing algorithm to the tenant ingress traffic on the local multi-tenant edge device; and
- based on the second flow hashing algorithm being optimal, applying the second flow hashing algorithm to the tenant ingress traffic on the local multi-tenant edge device.

* * * * *